United States Patent
Jain

(10) Patent No.: US 12,514,634 B1
(45) Date of Patent: Jan. 6, 2026

(54) METHODS AND SYSTEMS FOR ANALYSIS OF PULMONARY VEIN POTENTIALS

(71) Applicant: Neutrace Inc., Longwood, FL (US)

(72) Inventor: Rohit Jain, Danville, CA (US)

(73) Assignee: Anumana, Inc., Cambridge, MA (US)

( * ) Notice: Subject to any disclaimer, the term of this patent is extended or adjusted under 35 U.S.C. 154(b) by 498 days.

(21) Appl. No.: 18/058,844

(22) Filed: Nov. 25, 2022

Related U.S. Application Data

(60) Provisional application No. 63/264,584, filed on Nov. 25, 2021.

(51) Int. Cl.
*A61B 18/14* (2006.01)
*A61B 17/00* (2006.01)
*A61B 18/00* (2006.01)

(52) U.S. Cl.
CPC .............. *A61B 18/1492* (2013.01); *A61B 2017/00243* (2013.01); *A61B 2018/00363* (2013.01)

(58) Field of Classification Search
CPC ......... A61B 5/283; A61B 5/287; A61B 5/346; A61B 5/349; A61B 5/367; A61B 2018/00351; A61B 2018/00375; A61B 18/1492
See application file for complete search history.

(56) References Cited

U.S. PATENT DOCUMENTS

2017/0181655 A1 * 6/2017 El Haddad ........... A61B 5/7282

FOREIGN PATENT DOCUMENTS

WO WO-2018106496 A1 * 6/2018 ............. A61B 18/04

OTHER PUBLICATIONS

Bakker, Electrogram recording and analyzing techniques to optimize selection of target sites for ablation of cardiac arrhythmias, 2019, Pacing Clin Electrophysiol. 42:1503-1516. (Year: 2019).*
Garg, L., Pothineni, N.V.K., Daw, J.M., Hyman. M.C., Arkles, J., Tschabrunn, C.M., Santangeli, P., Marchlinski, F.E. 2020, Frontiers in Physiology. 11:594654. (Year: 2020).*

* cited by examiner

*Primary Examiner* — Eun Hwa Kim
(74) *Attorney, Agent, or Firm* — Caldwell Intellectual Property Law

(57) ABSTRACT

A method and system is disclosed for the detection of pulmonary vein potentials when mapping a heart. The method comprises acquiring a voltage signal from a catheter inserted into a heart and performing real time beat detection to isolate the beats in said signal. Next a minimum threshold is computed to indicate the presence of a pulmonary vein potential. The voltage signal may be marked to indicate the presence of a pulmonary vein potential based on the minimum threshold.

17 Claims, 8 Drawing Sheets

METHODS AND SYSTEMS FOR ANALYSIS OF PULMONARY VEIN POTENTIALS

FIELD

Embodiments of the present invention relate to generally two electrophysiology, and more particularly to detection of arrhythmias.

BACKGROUND

Catheters may be inserted into the heart of a patient to acquire voltage signals which can be analyzed to detect heart conditions such as, for example atrial fibrillation.

BRIEF SUMMARY

In one aspect, a method, for analyzing electrical signals acquired from a catheter inserted into the pulmonary vein of a patient to determine the presence of atrial fibrillation is disclosed.

Other aspects of the invention will be apparent from the detailed description below.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
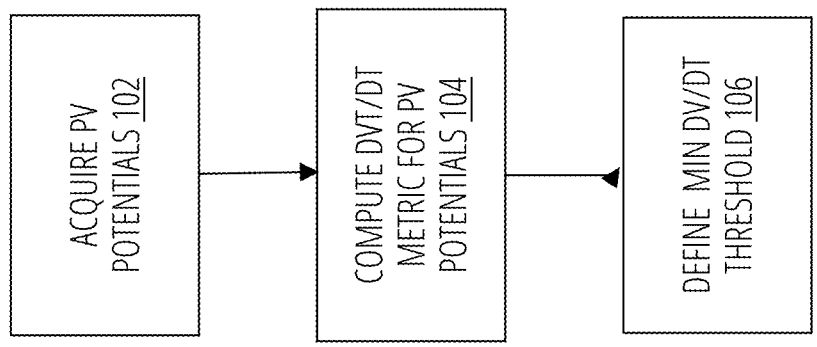
FIG. 1 illustrates a routine in accordance with one embodiment.

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to or combined, without limiting the scope to the embodiments disclosed herein.

Referring to FIG. 1, at block 102 pulmonary vein potentials (PV signals) are acquired from a catheter inserted into each pulmonary vein of a patient. The pulmonary vein potentials may comprise signals for the Left Inferior Pulmonary Vein (LIPV), Left Superior Pulmonary Vein (LSPV), Right Inferior Pulmonary Vein (RIPV), and Right Superior Pulmonary Vein (RSPV). At block 104, the first derivative dv/dt for of the signals for each pulmonary vein is calculated. At block 106, a minimum threshold in the dv/dt signal is determined, which threshold is to be used as an indicator of whether pulmonary vein potentials exist or not, as will be described. In one embodiment, the minimum threshold may be computed using a root means square deviation (RMSD) calculated for windowed segments in the dv/dt signals. In one embodiment, the computed values for the RSMD trending to words zero is deemed to be indicative of the disappearance of PV potentials within each PV signal.

Figure 2:
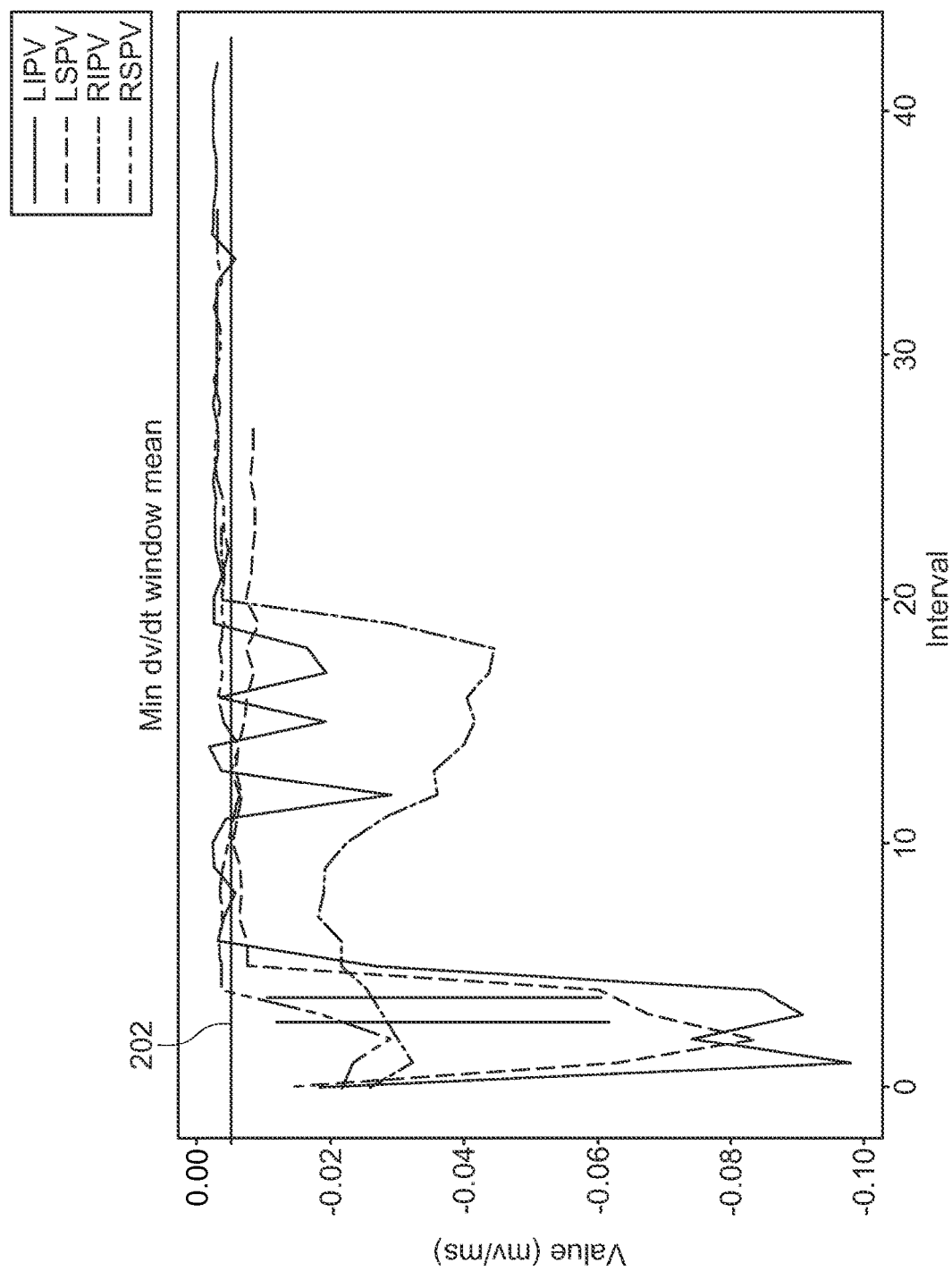
FIG. 2 illustrates how the minimum threshold in the dv/dt signal is computed in accordance with one embodiment.

FIG. 2 of the drawings illustrates how the minimum threshold in the dv/dt signal is computed in accordance with one embodiment. Referring to FIG. 2, the signals corresponding to LIPV, LSPV, RIPV, and RSPV are as indicated. Initially the signals exhibit a sharp downward spike in the value for dv/dt but eventually flattens out to a value indicated by the line 202 which is closer to zero and indicates the disappearance of PV potentials.

Figure 3:
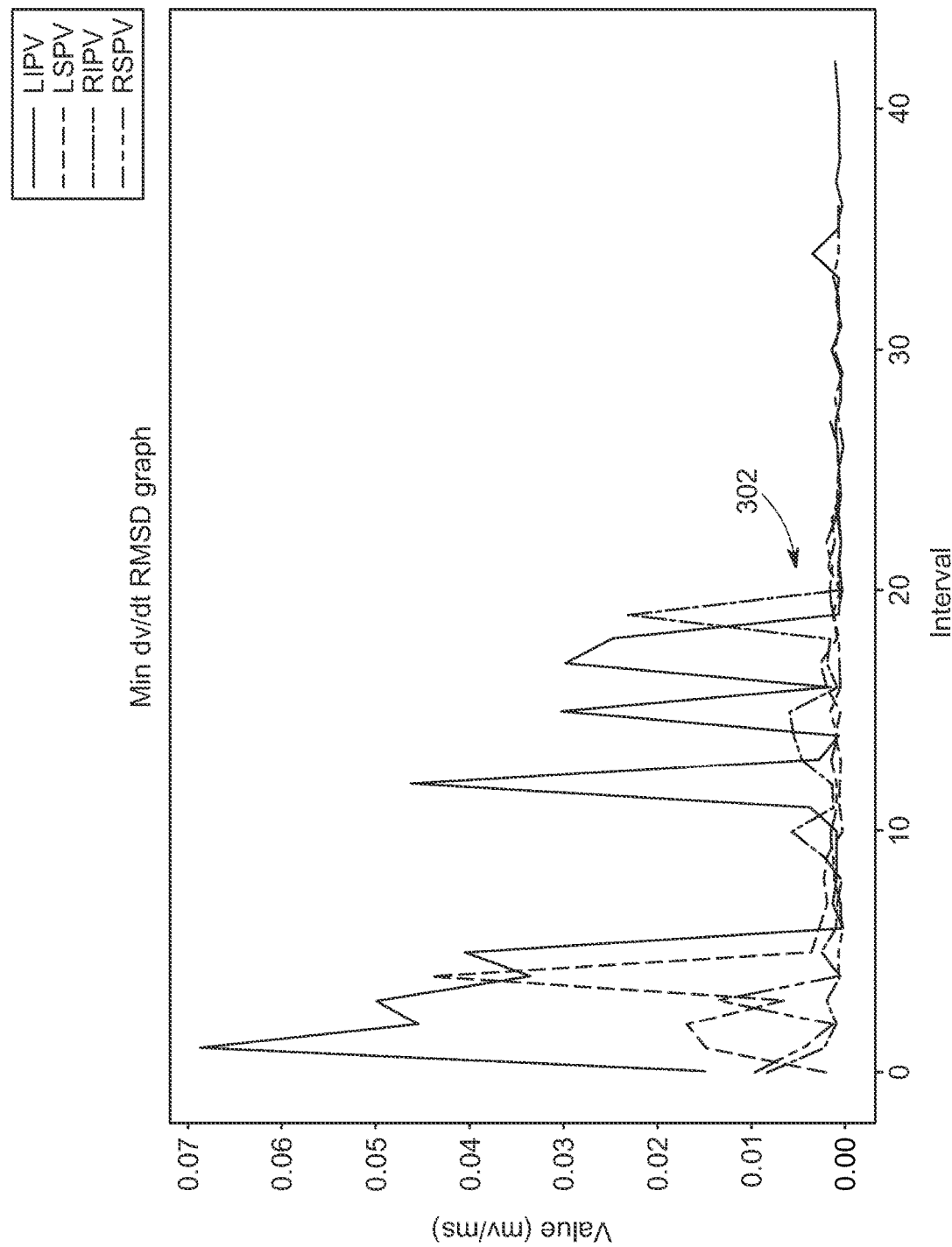
FIG. 3 shows a part of the RMSD calculated for each PV signal indicated in FIG. 2.

FIG. 3 of the drawings shows a part of the RMSD calculated for each PV signal indicated in FIG. 2. As will be seen, the RMSD for each PV signal eventually trends to zero (in the region indicated by arrow 302) which indicates the disappearance of the PV potential in that signal.

Figure 4:
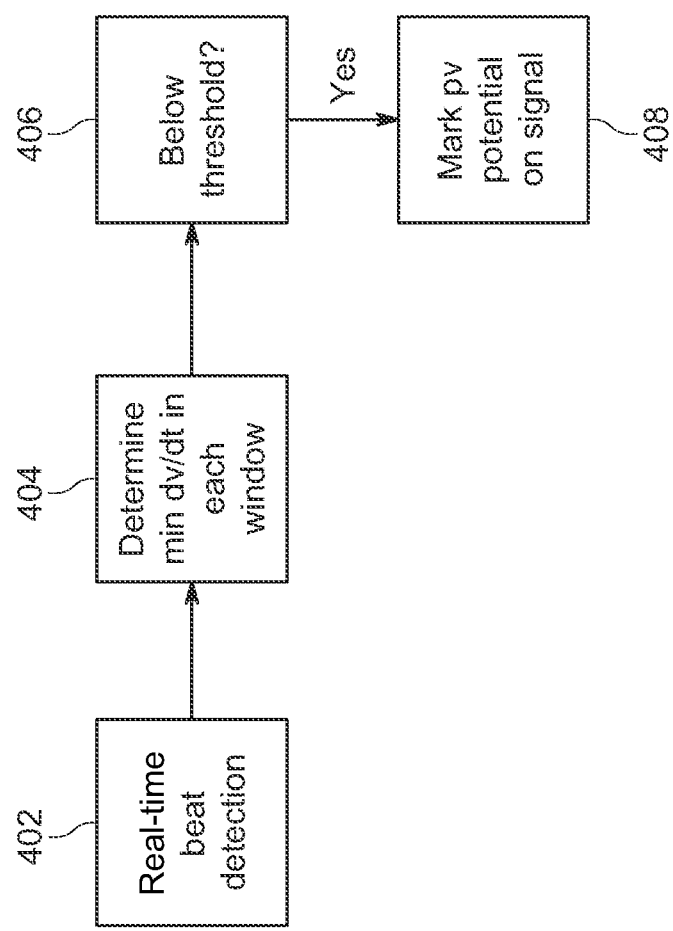
FIG. 4 illustrates a flow chart of operations performed to indicate the presence of a PV potential in a PV signal in accordance with one embodiment.

Referring now to FIG. 4 of the drawings, a flow chart of operations performed to indicate the presence of a PV potential in a PV signal is shown. Starting at block 402, real time beat detection is performed. This step may be achieved by using the QRS to determine each beat in the PV signals. Next, in each window (for example, in one embodiment the window may include 5 ms of data) a value for min dv/dt is determined. At block 404, a check is made to see if the calculated dv/dt within the window is above minimum threshold. If at block 406 it is determined that the dv/dt is below the minimum threshold then a PV potential exists in the signal and a visual marker is generated at block 408 to indicate the presence of the pulmonary vein potential.

Figure 5:
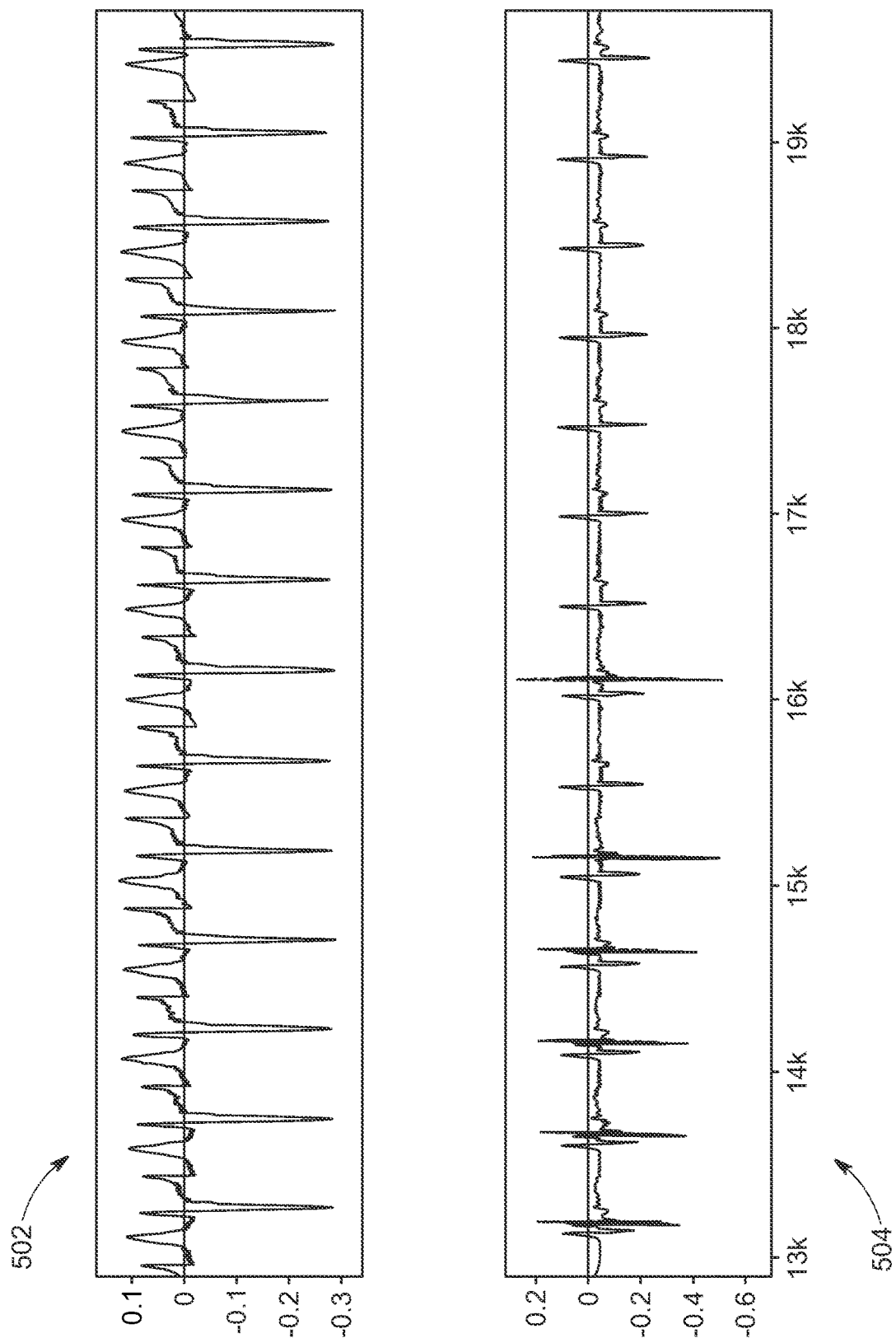
FIG. 5 illustrates how PV signals may be marked up in accordance with one embodiment.

FIG. 5 of the drawings illustrates how PV signals may be marked up in accordance with one embodiment, to indicate the presence of PV potentials. Referring to the drawing, reference numeral 502 generally indicates a body surface potential, with the QRS onset indicating the commencement of each beat marked thereon. Reference numeral 504 indicates the dv/dt metric calculated for a PV signal. Based on the techniques described above, the purple highlights indicate beats for which there is a presence of a PV potential in the PV signal. Advantageously, the indication of the presence of the PV potential may be used by an electrophysiologist to continue ablating as long as the PV potential in the signal is indicated and to stop ablating only when the PV potential disappears.

Figure 6:
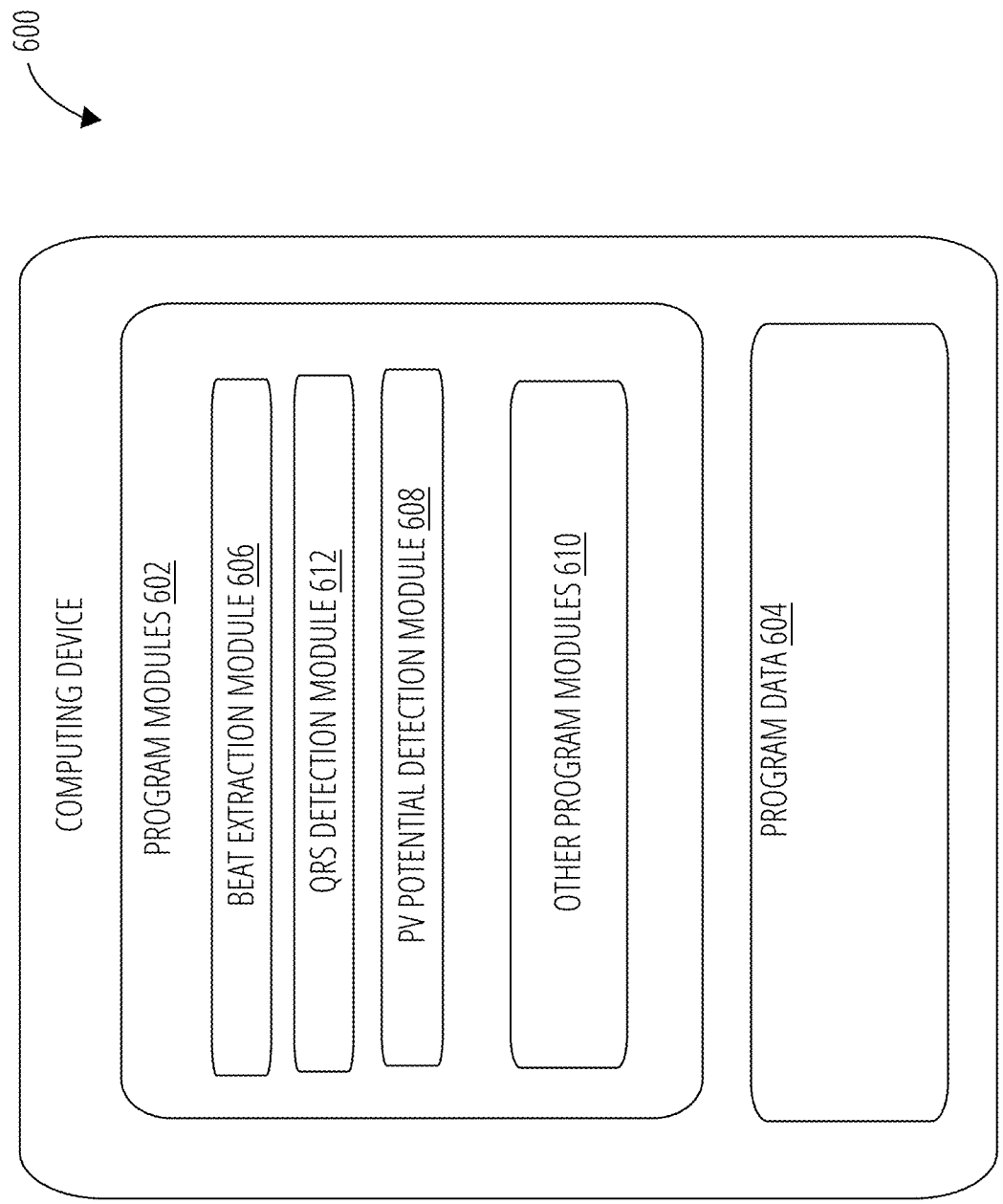
FIG. 6 illustrates one embodiment of high-level block diagram of a computing device for practicing aspects of the invention.

FIG. 6 shows an exemplary system in the form of a computing device 600 for implementing the techniques disclosed herein, in accordance with one embodiment of the invention. Computing device 600 may represent any type of computing device such as a laptop, server, etc. Computing device 600 comprises program modules 602 and program data 604. Program modules 602 may comprise, for example, beat extraction module 606, QRS detection module 608, PV potential detection module that implements the above-described techniques, and other program modules 610 such as an operating system, etc.

In use, computing device 600 may form part of a cardiac mapping system 700 (which is described later with reference to FIG. 7) configured to receive electrocardiogram (ECG) signals and electrophysiological data for a heart. Cardiac mapping system 700 is operable to first select a set of surface electrodes which are then driven with current pulses. While the current pulses are being delivered, electrical activity, such as the voltage is measured with at least one of the remaining surface electrodes and in vivo electrodes and stored.

In accordance with one embodiment of the invention, cardiac mapping system 700 also includes an electrocardiogram system (not shown) to generate electrocardiograms (ECGs) for a patient. The system 700 also generates electrophysiological (EP) data in the form of EP data points each comprising a recording location within the heart (specified in terms of X, Y, and Z coordinates) and a voltage reading recorded at said location. Thus, each voltage measurement may be associated with position data comprising the spatial location within the heart at which the voltage measurement was made.

Figure 7:
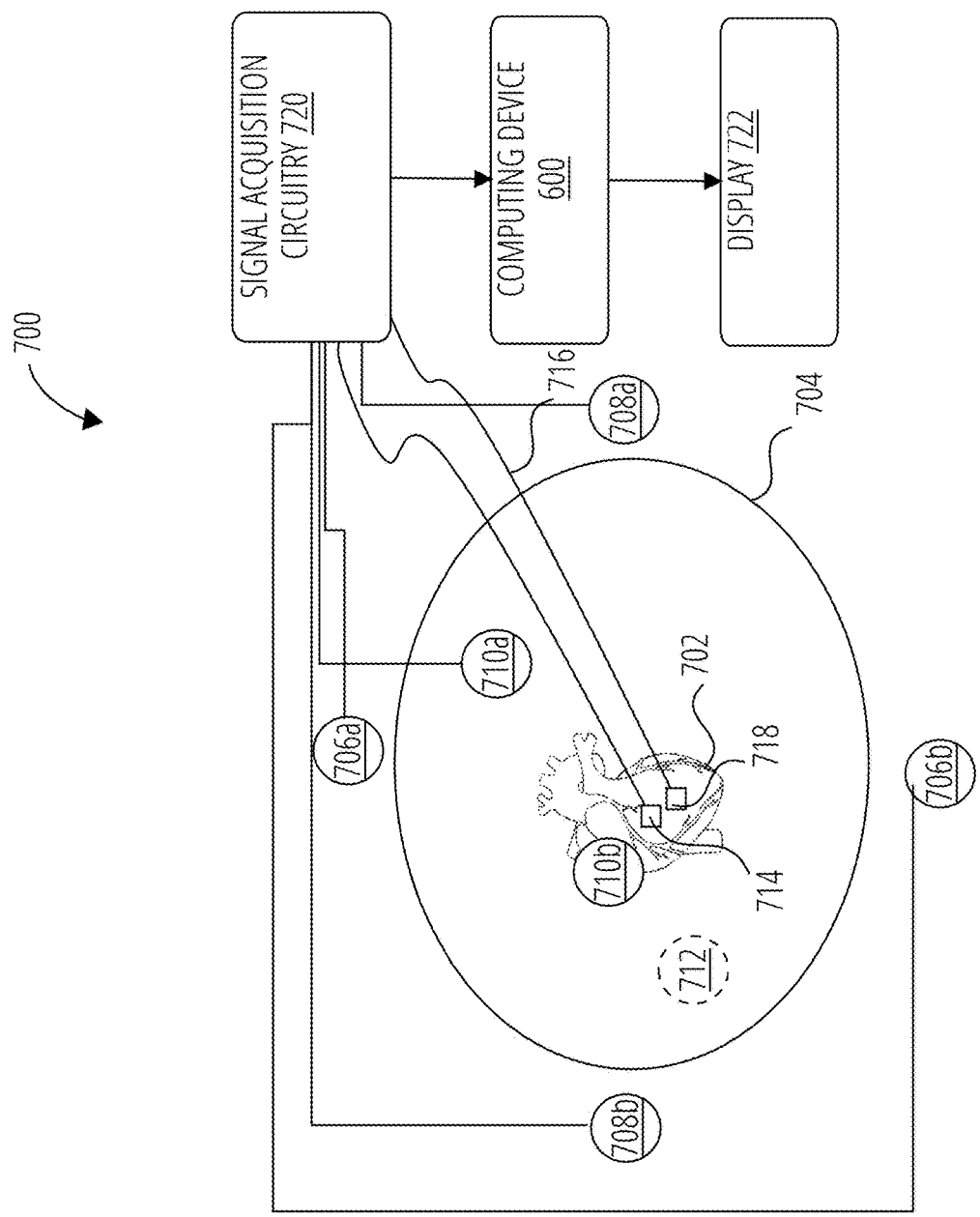
FIG. 7 illustrates an embodiment of a mapping system which may be used to implement aspects of the techniques disclosed herein.

FIG. 7, which shows a schematic diagram of a cardiac mapping system 700 for conducting cardiac electrophysiology studies by navigating a cardiac catheter and measuring electrical activity occurring in a heart 702 of a patient 704 and three-dimensionally mapping the electrical activity and/or information related to or representative of the electrical activity. Cardiac mapping system 700 can be used to help create an anatomical model using one or more electrodes. Cardiac mapping system 700 can also be used to measure electrophysiology data at a plurality of points along a cardiac surface and store the measured data in association with location information for each measurement point at which the electrophysiology data was measured.

The cardiac mapping system 700 comprises a computing device 100, X-axis surface electrodes 706a, 706b, Y-axis surface electrodes 708a, 708b, Z-axis surface electrodes 710a, 710b, surface reference electrode 712, fixed intra-cardiac electrode 714, mapping catheter 716, mapping electrode 718, signal acquisition circuitry 720, and a display 722.

The surface electrodes (e.g., patch electrodes) are shown applied to a surface of patient 704 along an X-axis, a Y-axis, and a Z-axis. Surface reference electrode 712 provides a reference and/or ground electrode for the cardiac mapping system 700. Surface reference electrode 712 may be an alternative to fixed intra-cardiac electrode 714. It should also be appreciated that, in addition, the patient 704 will have most or all of the conventional electrocardiogram (ECG) system leads in place. This ECG information is available to cardiac mapping system 700 although not illustrated in the FIG. 7.

In one embodiment, the localization/mapping system is the EnSite NavX™ navigation and visualization system of St. Jude Medical, Atrial Fibrillation Division, Inc. Other localization systems, however, may be used in connection with the present invention, including for example, the CARTO navigational and location system of Biosense Webster, Inc. and the LOCALISA intracardiac navigation system of Medtronic, Inc. The localization and mapping systems described in the following patents (all of which are hereby incorporated by reference in their entireties) can be used with the present invention: U.S. Pat. Nos. 6,990,370; 6,978,168; 6,947,785; 6,939,309; 6,728,562; 6,640,119; and 5,983,126.

Each surface electrode is coupled to the multiplex switch of signal acquisition circuitry 720 and the pairs of electrodes are selected by software running on computing device 100, which couples the electrodes to a signal generator of the signal acquisition circuitry 720. Computing device 100, for example, may comprise a conventional general-purpose computer, a special-purpose computer, a distributed computer, or any other type of computer. The computing device 100 may comprise one or more processors, such as a single central-processing unit, or a plurality of processing units, commonly referred to as a parallel processing environment.

Generally, three nominally orthogonal electric fields are generated by a series of driven and sensed electric dipoles in order to realize catheter navigation in a biological conductor. Alternately, these orthogonal fields can be decomposed and any pairs of surface electrodes can be driven as dipoles to provide effective electrode triangulation. Additionally, such nonorthogonal methodologies add to the flexibility of the system. For any desired axis, the potentials measured across a fixed intra-cardiac electrode 714 resulting from a predetermined set of drive (source-sink) configurations are combined algebraically to yield the same effective potential as would be obtained by simply driving a uniform current along the orthogonal axes.

Any two of the surface electrodes may be selected as a dipole source and drain with respect to a ground reference, e.g., the surface reference electrode 712 while the unexcited electrodes measure voltage with respect to the ground reference. The mapping/measurement electrode 718 placed in the heart 702 is exposed to the field from a current pulse and is measured with respect to ground, e.g., the surface reference electrode 712. In practice the catheters within the heart may contain multiple electrodes and each electrode potential may be measured. As previously noted, at least one electrode may be fixed to the interior surface of the heart to form a fixed intra-cardiac electrode 714, which is also measured with respect to ground. Data sets from each of the surface electrodes, the internal electrodes, and the virtual electrodes may all be used to determine the location of the measurement electrode 718 or other electrodes within the heart 702.

In summary, the cardiac mapping system 700 first selects a set of surface electrodes and then drives them with current pulses. While the current pulses are being delivered, electrical activity, such as the voltages measured at least one of the remaining surface electrodes and in vivo electrodes are measured and stored. At this point, compensation for artifacts, such as respiration and/or impedance shifting may be performed as indicated above. As described above, various location data points are collected by the cardiac mapping system 700 that are associated with multiple electrode locations (e.g., endocardial electrode locations). Each point in the set has coordinates in space.

Figure 8:
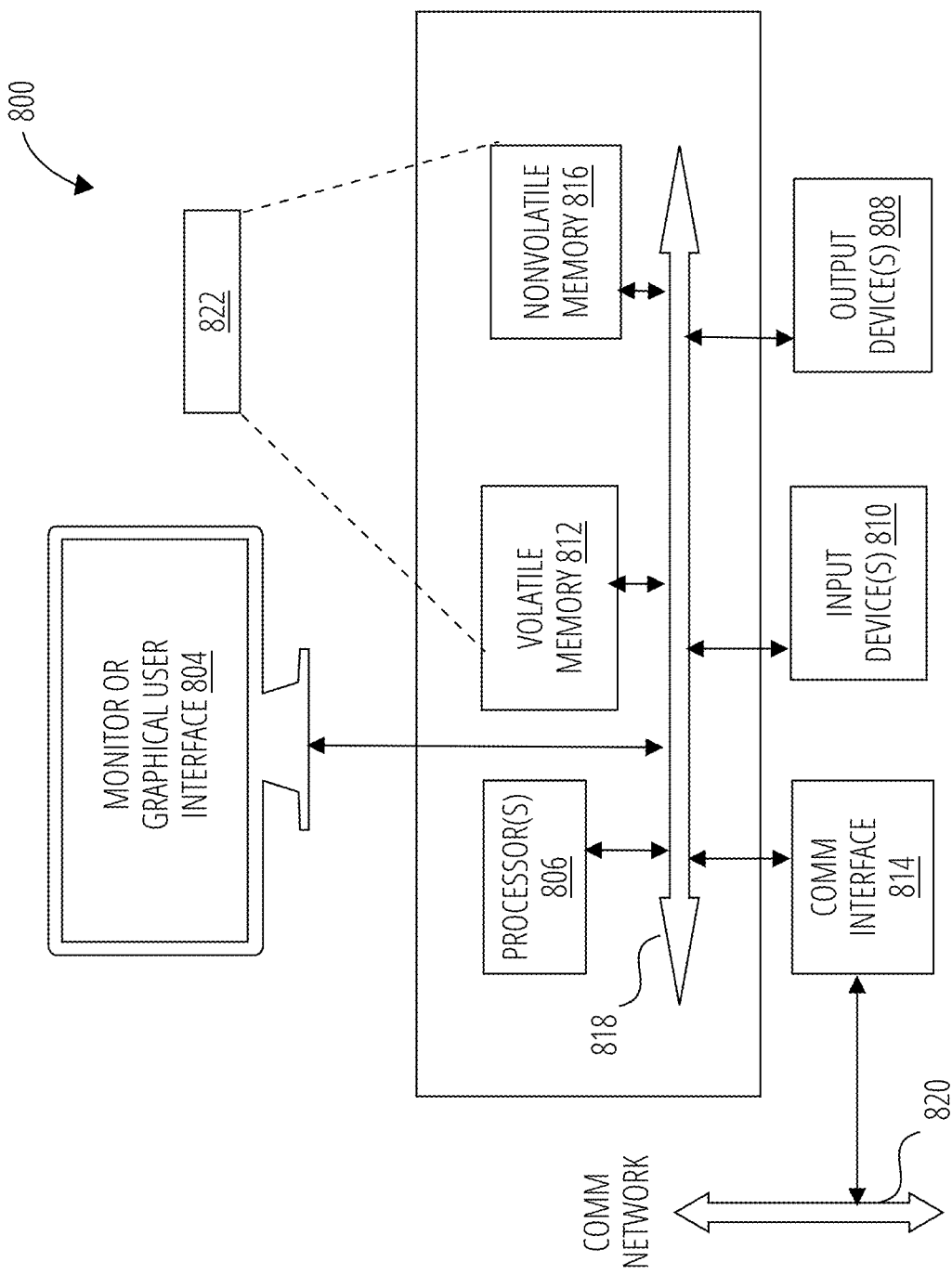
FIG. 8 illustrates a high-level block diagram of exemplary hardware for the computing device.

FIG. 8 is an example block diagram of hardware for the computing device 100 in accordance with one embodiment of the present invention. FIG. 8 is merely illustrative of a machine system to carry out aspects of the technical processes described herein and does not limit the scope of the claims. One of ordinary skill in the art would recognize other variations, modifications, and alternatives. In one embodiment, the computing device 100 typically includes a monitor or graphical user interface 804, a data processing system 802, a communication network interface 814, input device(s) 810, output device(s) 808, and the like.

As depicted in FIG. 8, the data processing system 802 may include one or more processor(s) 806 that communicate with a number of peripheral devices via a bus subsystem 818. These peripheral devices may include input device(s) 810, output device(s) 808, communication network interface 814, and a storage subsystem, such as a volatile memory 812 and a nonvolatile memory 816.

The volatile memory 812 and/or the nonvolatile memory 816 may store computer-executable instructions and thus forming logic 822 that when applied to and executed by the processor(s) 806 implement embodiments of the processes disclosed herein.

The input device(s) 810 include devices and mechanisms for inputting information to the data processing system 802. These may include a keyboard, a keypad, a touch screen incorporated into the monitor or graphical user interface 804, audio input devices such as voice recognition systems, microphones, and other types of input devices. In various embodiments, the input device(s) 810 may be embodied as a computer mouse, a trackball, a track pad, a joystick, wireless remote, drawing tablet, voice command system, eye tracking system, and the like. The input device(s) 810 typically allow a user to select objects, icons, control areas, text and the like that appear on the monitor or graphical user interface 804 via a command such as a click of a button or the like.

The output device(s) 808 include devices and mechanisms for outputting information from the data processing system 802. These may include the monitor or graphical user interface 804, speakers, printers, infrared LEDs, and so on as well understood in the art.

The communication network interface 814 provides an interface to communication networks (e.g., communication network 820) and devices external to the data processing system 802. The communication network interface 814 may serve as an interface for receiving data from and transmitting data to other systems. Embodiments of the communication network interface 814 may include an Ethernet interface, a modem (telephone, satellite, cable, ISDN), (asynchronous) digital subscriber line (DSL), FireWire, USB, a wireless communication interface such as BlueTooth or WiFi, a near field communication wireless interface, a cellular interface, and the like.

The communication network interface 814 may be coupled to the communication network 820 via an antenna, a cable, or the like. In some embodiments, the communication network interface 814 may be physically integrated on a circuit board of the data processing system 802, or in some cases may be implemented in software or firmware, such as "soft modems", or the like.

The computing device 200 may include logic that enables communications over a network using protocols such as HTTP, TCP/IP, RTP/RTSP, IPX, UDP and the like.

The volatile memory 812 and the nonvolatile memory 816 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 812 and the nonvolatile memory 816 may be configured to store the basic programming and data constructs that provide the functionality of the disclosed processes and other embodiments thereof that fall within the scope of the present invention.

Logic 822 that implements embodiments of the present invention may be stored in the volatile memory 812 and/or the nonvolatile memory 816. Said logic 822 may be read from the volatile memory 812 and/or nonvolatile memory 816 and executed by the processor(s) 806. The volatile memory 812 and the nonvolatile memory 816 may also provide a repository for storing data used by the logic 822.

The volatile memory 812 and the nonvolatile memory 816 may include a number of memories including a main random-access memory (RAM) for storage of instructions and data during program execution and a read only memory (ROM) in which read-only non-transitory instructions are stored. The volatile memory 812 and the nonvolatile memory 816 may include a file storage subsystem providing persistent (non-volatile) storage for program and data files. The volatile memory 812 and the nonvolatile memory 816 may include removable storage systems, such as removable flash memory.

The bus subsystem 818 provides a mechanism for enabling the various components and subsystems of data processing system 802 communicate with each other as intended. Although the communication network interface 814 is depicted schematically as a single bus, some embodiments of the bus subsystem 818 may utilize multiple distinct busses.

It will be readily apparent to one of ordinary skill in the art that the computing device 200 may be a device such as a smartphone, a desktop computer, a laptop computer, a rack-mounted computer system, a computer server, or a tablet computer device. As commonly known in the art, the computing device 200 may be implemented as a collection of multiple networked computing devices. Further, the computing device 200 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non-transitory machine-readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

QRS detection may be performed in accordance with the techniques disclosed in co-pending U.S. patent application Ser. No. 17/073,211 entitled "METHOD AND SYSTEM FOR DETERMINING QRS ONSET AND CARDIAC SIGNALS", which is incorporated herein by reference.

Disclosed in co-pending U.S. patent application Ser. No. 17/339,999 entitled "METHOD AND SYSTEMS FOR CLASSIFYING A HEARTBEAT ASSOCIATED WITH PATIENTS IN SINUS RHYTHM", which is incorporated herein by reference.

The invention claimed is:

1. A method for analyzing pulmonary vein potentials during an ablation procedure of a heart of a patient, comprising:
   inserting a catheter into the heart and positioning the catheter into a pulmonary vein of the patient;
   receiving a pulmonary vein potential signal from the pulmonary vein;
   delivering ablation energy via the catheter to the pulmonary vein;
   computing a first derivative of the pulmonary vein potential signal within a window corresponding to each beat of the heart;
   computing a minimum value of the first derivative of the pulmonary vein potential signal within each of the window;
   comparing the minimum value of the first derivative of the pulmonary vein potential signal with a threshold within each of the window;
   determining a loss of the pulmonary vein potential when the minimum value of the first derivative of the pulmonary vein potential signal exceeds the threshold of a respective window of the windows; and
   stop delivering the ablation energy to the pulmonary vein based upon the determined loss of the pulmonary vein potential.

2. The method of claim 1, wherein the threshold is computed based on a root mean square deviation (RMSD) of the first derivative of the pulmonary vein potential signal.

3. The method of claim 1, wherein the window is at least 5 milliseconds of data.

4. The method of claim 1, wherein detecting each beat of the heart is based upon a QRS onset using a body surface potential.

5. The method of claim 1, further comprises generating a visual marker to indicate a presence of the pulmonary vein potential when the first derivative of the pulmonary vein is below the threshold.

6. The method of claim 5, wherein the visual marker is presented in a graphical user interface to guide the ablation procedure.

7. The method of claim 1, wherein the loss of the pulmonary vein potential is indicated by the first derivative of the pulmonary vein potential trends towards the threshold of zero at the respective window.

8. The method of claim 1, wherein the catheter is inserted into at least a left inferior pulmonary vein, left superior pulmonary vein, right inferior pulmonary vein, or right superior pulmonary vein.

9. The method of claim 1, wherein the first derivative of the pulmonary vein potential within each of the windows is calculated using a beat extraction module and a QRS detection module of a computing device.

10. An apparatus for analyzing pulmonary vein potential during an ablation procedure of a heart of a patient, comprising:
    a catheter;
    at least a processor; and
    a memory communicatively connected to the processor, the memory containing instructions configuring the at least one processor to:
      receiving a pulmonary vein potential signal using the catheter positioned into a pulmonary vein of the patient;
      delivering ablation energy to the pulmonary vein via the catheter;
      computing a first derivative of the pulmonary vein potential signal within a window corresponding to each beat of the heart;
      computing a minimum value of the first derivative of the pulmonary vein potential signal within each of the window;
      comparing the minimum value of the first derivative of the pulmonary vein potential signal with a threshold within each of the window;
      determining a loss of the pulmonary vein potential when the minimum value of the first derivative of the pulmonary vein potential signal exceeds the threshold of a respective window of the windows; and
      stopping ablation energy delivery to the pulmonary vein based upon the determined loss of the pulmonary vein potential.

11. The apparatus of claim 10, wherein the at least a processor is configured to compute the threshold based on a root mean square deviation (RMSD) of the first derivative of the pulmonary vein potential signal.

12. The apparatus of claim 10, wherein the window is at least 5 milliseconds of data.

13. The apparatus of claim 10, wherein detecting each beat of the heart is based upon a QRS onset using a body surface potential measured by a plurality of body surface electrodes.

14. The apparatus of claim 10, the at least a processor is further configured to generating a visual marker on a graphical user interface to indicate a presence of the pulmonary vein potential when the first derivative of the pulmonary vein is below the threshold.

15. The apparatus of claim 10, wherein the at least a processor is configured to determine the loss of the pulmonary vein potential when the first derivative of the pulmonary vein potential reaches the threshold of zero at the respective window.

16. The apparatus of claim 1, wherein the catheter is configured to be inserted into at least a left inferior pulmonary vein, left superior pulmonary vein, right inferior pulmonary vein, or right superior pulmonary vein.

17. The apparatus of claim 10, further comprises a beat extraction module and a QRS detection module configured to calculate the first derivative of the pulmonary vein potential within each of the windows.

\* \* \* \* \*